United States Patent

[11] 3,543,889

[72] Inventors Charles F. Roselius
  Kinnelon;
  George A. Pelikan, Closter, New Jersey
[21] Appl. No. 710,038
[22] Filed March 4, 1968
  Continuation-in-part of Ser. No. 576,336,
  Aug. 31, 1966, now Pat. No. 3,372,799.
[45] Patented Dec. 1, 1970
[73] Assignee Robert M. Holloway, Robert L. Ludington
  Michigan City, Indiana
  by mesne assignment

[54] BRAKE REGULATOR INSTALLATION
  23 Claims, 11 Drawing Figs.
[52] U.S. Cl. ........................................ 188/197,
  188/202
[51] Int. Cl. ........................................ F16d 65/52

[50] Field of Search ........................................ 188/197,
  198—203(PL), (PLR)

[56] References Cited
  UNITED STATES PATENTS
  3,378,112 4/1968 Roselius et al. ............... 188/197
  3,435,923 4/1969 Billeter ........................ 188/197

Primary Examiner—Duane A. Reger
Attorney—Ward, Mc Elhannon, Brooks & Fitzpatrick ABSTRACT: A braking system including a brake cylinder assembly which is mounted on the railway car frame adjacent one end thereof, and a brake regulator disposed adjacent thereto. New and improved lever means are provided for interconnecting the brake regulator and the brake cylinder assembly, and for interconnecting the brake cylinder assembly with the brake beam assemblies.

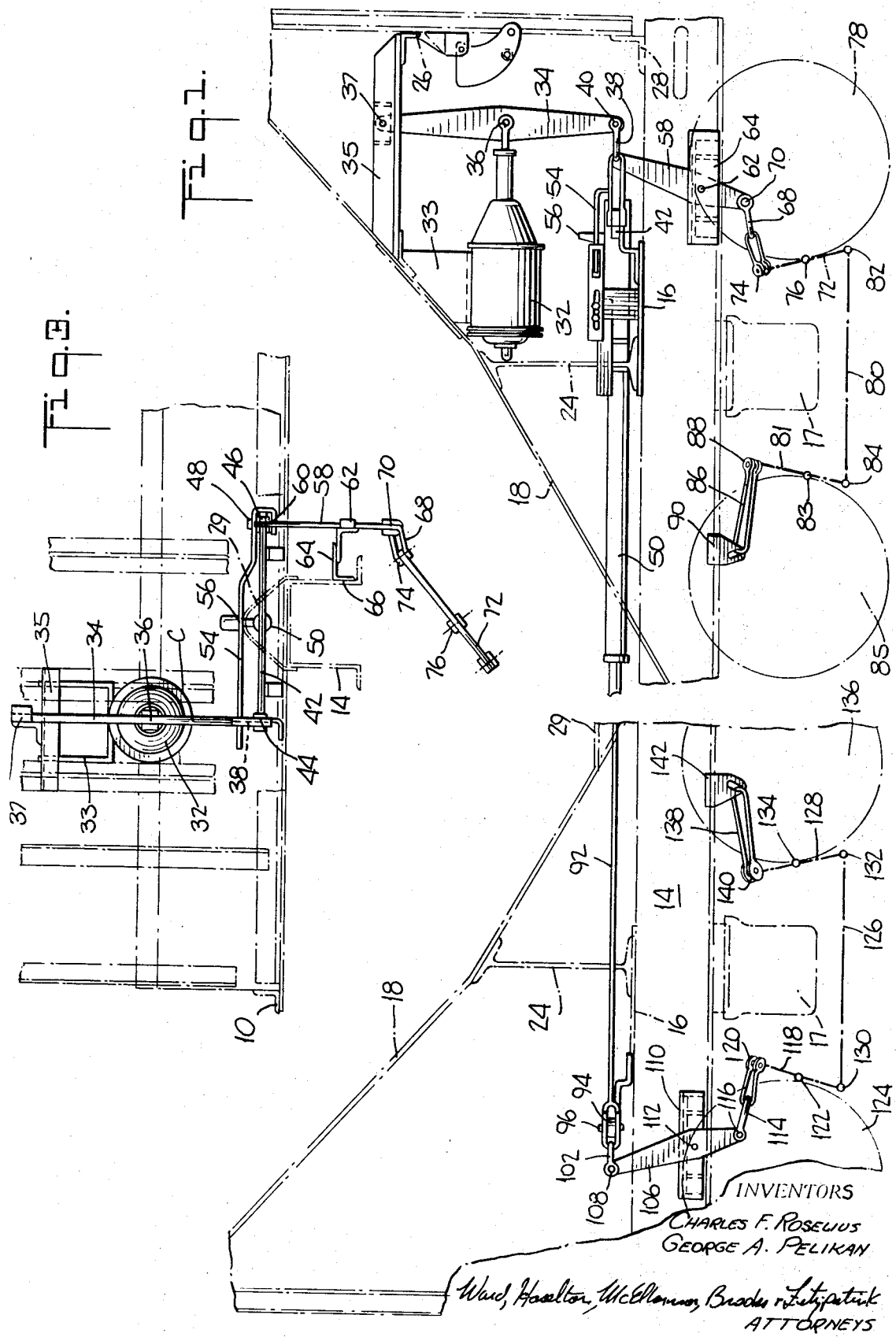

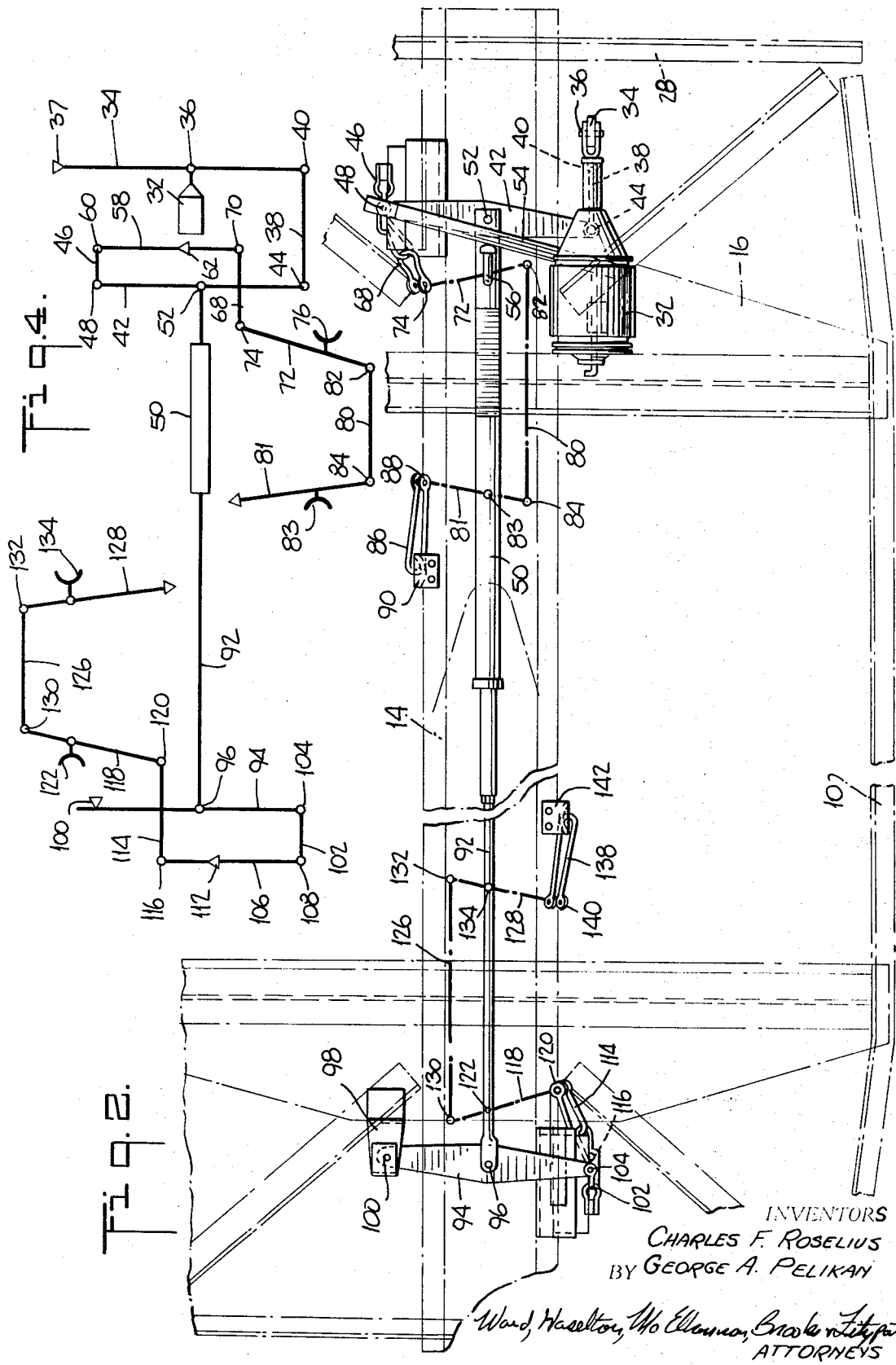

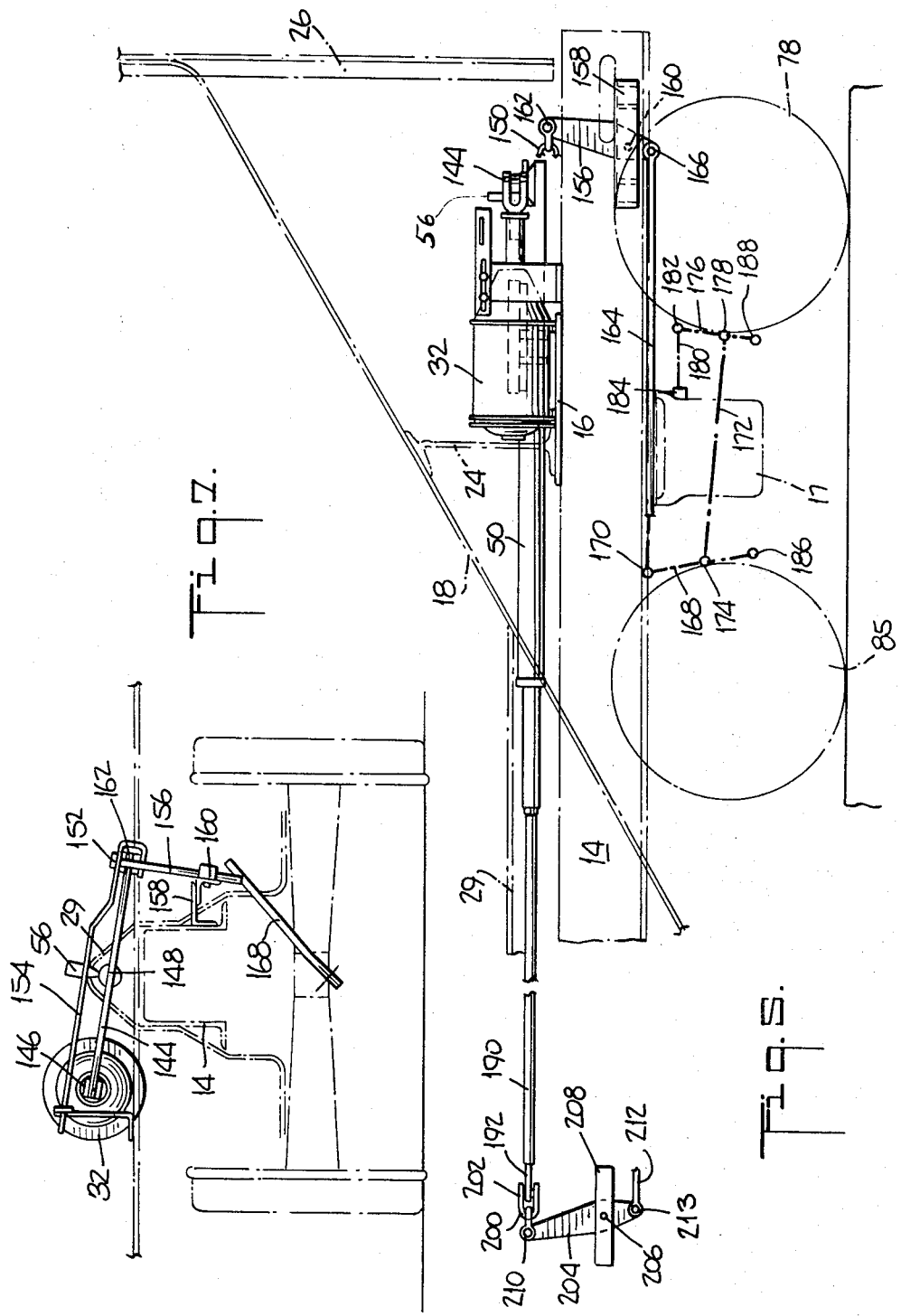

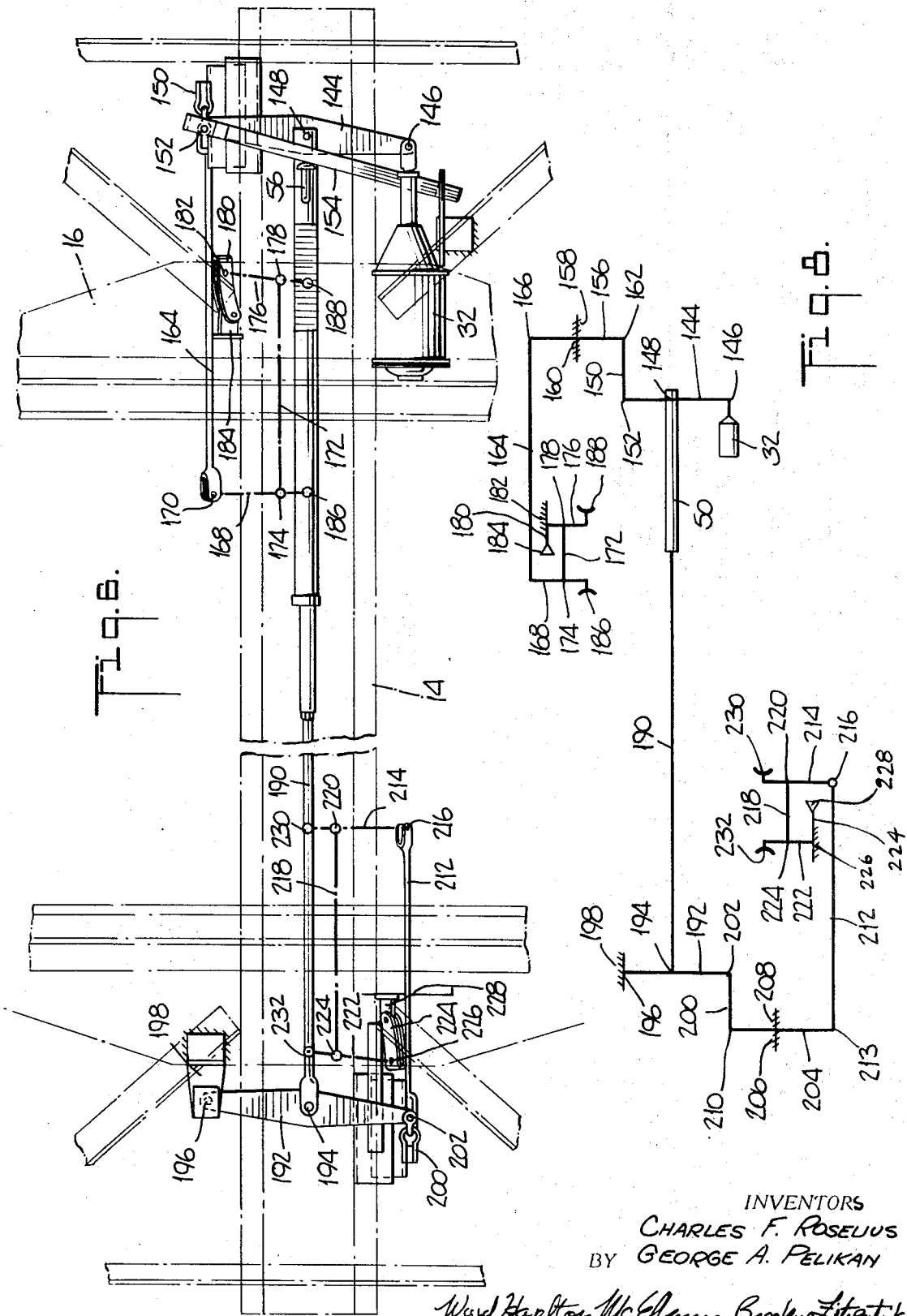

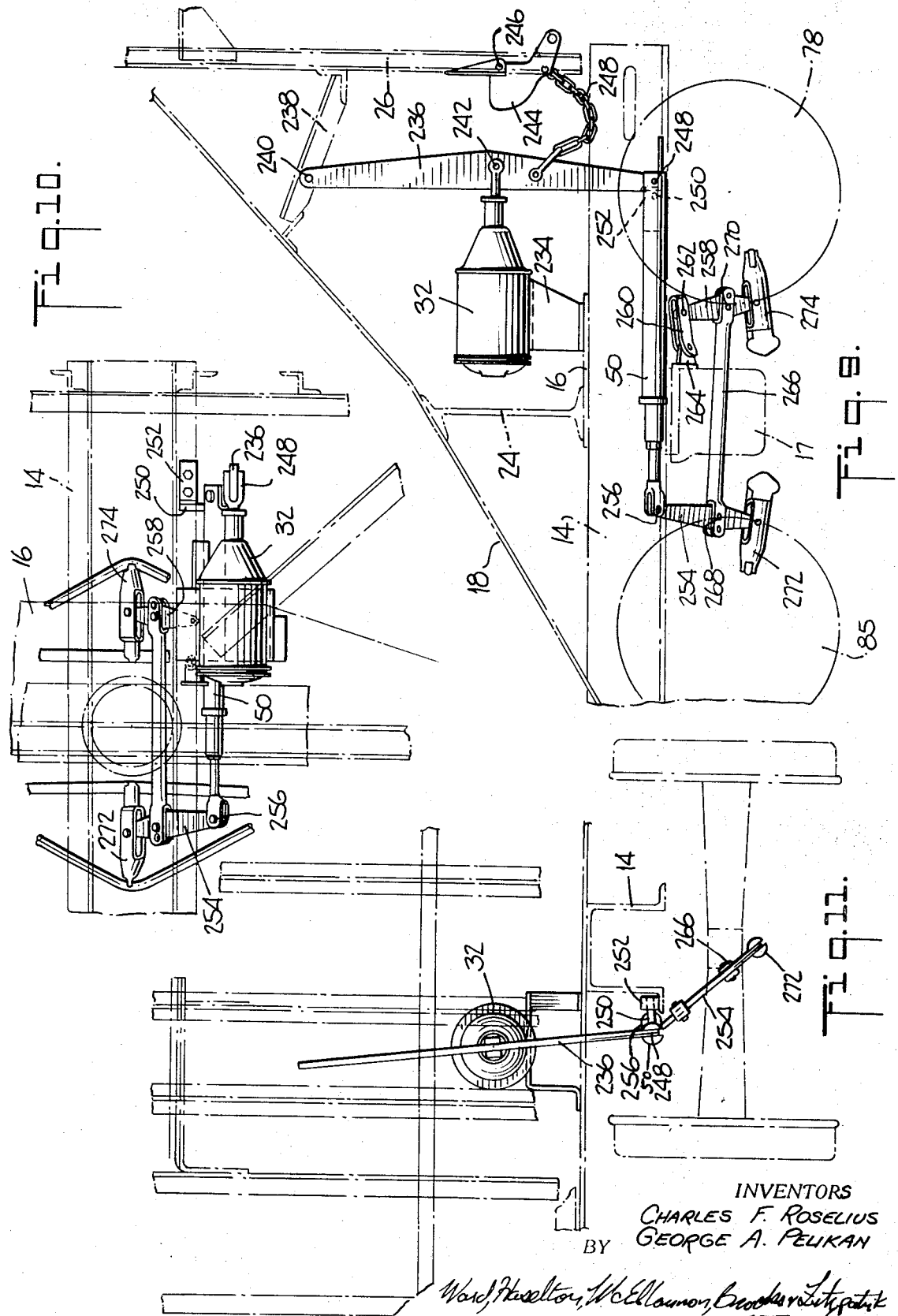

BRAKE REGULATOR INSTALLATION

This application is a continuation-in-part application of our copending application U.S. Pat. Ser. No. 576,336, entitled "Brake Regulator Installation", filed Aug. 31, 1966, now U.S. Pat. No. 3,372,779 issued Mar. 12, 1968.

This invention relates to braking systems and more particularly to improvements in such systems. Among many other possible uses, braking systems according to this invention are particularly desirable for use on railway freight cars, such as hopper cars.

It will be appreciated that hopper cars normally have sloping floor sheets for purposes of clearing the car of coal, or other lading, when the bottom doors are opened. Due to the fact that coal and similar lading is subject to freezing in the car during the winter months, it is often necessary to heat the car to free the lading therefrom. In this connection a number of different types of heating media are employed, such as a makeshift bonfire of scrap wood under the car, high intensity infrared lamps located along the sides of the car as well as thereunder, and high intensity gas or gasoline burners located under the cars, for example. Any one of these methods of heating the cars may not only free the lading but also damage various parts of the car structure due to being operated at too high a temperature rating or for too long a period of time.

Heretofore, brake regulators, or slack adjusters, were located under the car in various positions from the bottom of the cylinder lever to and beyond the latitudinal center of the car. It will be appreciated that anything located in these positions is at the lowest point on the car structure, except for the loading chutes and doors, and therefore subject to heat damage. Further, it will be appreciated that practically all of the double-acting brake regulators, or slack adjusters, employ loaded steel coil springs to actuate the brake rigging and remove any excessive slack. The coil springs are particularly vulnerable to heat and a spring annealed, due to excessive heating, renders the slack adjuster inoperative. When this occurs the device must be removed from the car, dismantled and the annealed spring replaced with a tempered spring, thereby causing an expense as well as a time delay.

Accordingly, a feature of the present invention is the provision of a new and improved braking system which overcomes the aforementioned difficulties encountered with such prior art systems.

As another feature of the invention, there is provided a new and improved braking system which is far superior to existing braking systems, and which is easy to install and operate.

Still another feature of this invention resides in the provision of a braking system which is reliable, compact and efficient.

In order to achieve the foregoing features, the invention contemplates the provision of a braking system comprising a brake cylinder assembly which is mounted on the railway car frame in a position adjacent one end of the car, and a brake regulator or slack adjuster disposed adjacent the same end of the railway car. Lever means are provided for interconnecting the brake regulator and the brake cylinder assembly. The braking system further comprises actuating means for the regulator. Means also connected to said lever means for actuating brake means comprise a connecting link, a lever and a truck lever connecting link. Further, a first truck lever is provided having one end connected to the truck lever connecting link, and a bottom rod is connected to the other end of the first truck lever, and a brake beam assembly is connected to a central portion of the first truck lever. The braking system further includes a second truck lever having one end connected to the bottom rod, a fulcrum connecting link connected to the other end of the second truck lever, a fulcrum member mounted on the center sill, the fulcrum connecting link being pivotally attached to the fulcrum member. A second brake beam assembly is connected to a medial portion of the second truck lever.

There has thus been outlined rather broadly the more important features of the invention in order that the detailed description thereof that follows may be better understood, and in order that the present contribution to the art may be better appreciated. There are, of course, additional features of the invention that will be described hereinafter which will form the subject of the claims appended hereto. Those skilled in the art will appreciate that the conception on which this disclosure is based may readily be utilized as the basis for the designing of other structures for carrying out the several purposes of the invention. It is important, therefore, that the claims be regarded as including such equivalent constructions as do not depart from the spirit and scope of the invention.

Several embodiments of the invention have been chosen for purposes of illustration and description, and are shown in the accompanying drawings, forming a part of the specification, wherein:

FIG. 1 is a fragmentary side elevation of a railway car incorporating a braking system constructed in accordance with the concept of this invention;

FIG. 2 is a fragmentary plan view of the railway car of FIG. 1;

FIG. 3 is a fragmentary end view of the railway car of FIG. 1;

FIG. 4 is a schematic diagram of the railway car of FIG. 1;

FIG. 5 is a fragmentary side elevation of a railway car showing a second embodiment of a braking assembly according to the concept of this invention;

FIG. 6 is a plan view of the railway car and braking system shown in FIG. 5;

FIG. 7 is a fragmentary end view of the railway car of FIG. 5;

FIG. 8 is a schematic diagram of the railway car of FIG. 5;

FIG. 9 is a fragmentary side elevation of a railway car showing another embodiment of a braking system according to the invention;

FIG. 10 is a fragmentary plan view of the braking system of FIG. 9 and showing the brake cylinder assembly, brake regulator and related parts; and FIG. 11 is an end view of a railway car incorporating the braking system as shown in FIG. 9.

In the embodiment of the invention illustrated in FIGS. 1—4, the railway car may be of any conventional type such as one having a pair of side sills 10 (only one shown) FIG. 3, a center sill 14, a horizontally disposed shear plate 16 connected to the sills, and a truck bolster 17. As best seen in FIG. 1, angularly disposed slope sheets 18 and a hopper door (not shown) form the floor of the car, the angular disposition of these members being such as to allow the coal or other lading to flow through the hopper door during the unloading operation. A slope sheet support 24 is interposed between the shear plate 16 and the slope sheet 18 towards the end of the railway car. At the end of the car, an end post 26 is provided which is attached to the upper surface of the center sill by an end sill 28. A center sill hood sheet 29 is disposed directly over the center sill.

Still referring to the embodiment of the invention shown in FIGS. 1—4, the braking system includes a brake cylinder assembly 32 mounted on a bracket 33 depending from the slope sheet 18 adjacent the slope sheet support 24. It is noted that the brake cylinder assembly 32 is mounted as high as practical on the railway car. The upper end of a vertically extending first or cylinder lever 34 is pivotally connected to a fixed cylinder lever support member 35 as at 37, the support member being mounted between the slope sheet 18 and the end post 26. The brake cylinder assembly is connected to the medial portion of the cylinder lever 34 as at 36. A rod 38 is substantially horizontally disposed and has one end connected to the lower end of the cylinder lever 34 as at 40.

A second lever 42 is substantially horizontally disposed and has one end pivotally connected to the rod 38 as at 44, and the other end pivotally connected to a connecting link 46 as at 48. A double-acting automatic brake regulator or slack adjuster 50 is pivotally connected to the medial portion of the second or horizontal lever 42, as at 52. As best seen in FIGS. 2 and 3, an actuating lever 54 is also connected at the connection 48 and is adapted to medially engage a trigger 56 protruding from the top of the brake regulator 50. Hence, movement of the second lever 42 moves the actuating lever 54 to trigger the brake regulator 50. Any suitable type of brake regulator may be employed. However, preferred brake regulators are disclosed in the E. C. Mersereau U.S. Pat. No. 3,001,612 and the Showers and Biscardi U.S. Pat. No. 3,096,859. It will be appreciated that the slack adjuster 50 is disposed directly over the center sill 14 and at the same time partially enclosed by the center sill hood sheet 29.

A third lever 58 which is substantially vertically disposed is movably connected to the connecting link 46, as at 60. The third lever is medially pivotally mounted, as at 62, on bracket 64, which is fixedly attached to the center sill 14, as at 66, FIG. 3. The other end of the third lever is pivotally connected to a truck lever-connecting linkage 68, as at 70, the truck lever-connecting linkage being, in turn, connected to a first truck live lever 72, as at 74. A brake beam assembly 76 is mounted on the central portion of the first truck lever 72 for engaging the railway car wheel 78, as shown in FIG. 1.

A bottom rod 80 pivotally interconnects the first truck lever 72 with a second truck lever 81, as at 82 and 84, respectively. As best seen in FIG. 1, the bottom rod 80 passes underneath the bolster 17. The other end of the second truck lever 81 is pivotally attached to a fulcrum-connecting link 86, as at 88, which in turn, is attached to fulcrum member 90, the fulcrum member being mounted on the center sill 14. A brake beam assembly 83 is mounted on a central portion of the second truck lever 81 for engaging a railway car wheel 85, as shown in FIG. 1.

For purposes of actuating the brake at the other end of the car, a center rod 92 is attached to the other end of the brake regulator 50 (FIGS. 1, 2 and 4). The other end of the center rod is pivotally connected to the medial portion of a fourth lever 94, as at 96. The fourth lever is substantially horizontally disposed and has one end pivotally connected to a bracket 98 as at 100, FIG. 2. The outer end of the fourth lever is pivotally connected to the second connecting link 102, as at 104, which in turn, is connected to a fifth lever 106, FIGS. 1 and 4, as at 108, the latter lever extending substantially vertically. The fifth lever is medially pivotally mounted on bracket 110, as at 112, the bracket being fixedly mounted on the center sill 14. The other end of the fifth lever 106 is pivotally connected to a second truck lever connecting linkage 114, as at 116. A third truck lever 119 is pivotally connected to the linkage 114, as at 120. This truck lever has a brake beam assembly 122 mounted on a central portion thereof for engaging the railway car wheel 124 (FIG. 1). A second bottom rod 126, which passes underneath the bolster 17, pivotally interconnects the third truck lever 118 to a fourth truck lever 128 as at 130 and 132, respectively. The fourth truck lever has a centrally mounted brake beam assembly 134 for engaging the railway car wheels 136. The other end of the fourth truck lever 128 is pivotally connected to a fulcrum connecting link 138, as at 140, which in turn, is attached to fulcrum member 142, the fulcrum member being mounted on the center sill 14.

In operation, movement of the brake cylinder assembly 32 causes movement of the cylinder lever 34 which, in turn, moves the rod 38, the second lever 42, the connecting link 46, the third lever 58, the truck lever connecting linkage 68, the first truck lever 72, the bottom rod 80, the second truck lever 81, thereby actuating the brake beam assemblies 76 and 83. At the other end of the railway car movement is transmitted to the brake beam assemblies 122 and 134 through the mechanism as follows: movement of the second lever 42 causes movement of the brake regulator 50, center rod 92, fourth lever 94, second connecting link 102, fifth lever 106, second truck lever connecting linkage 114, third truck lever 118, second bottom rod 126 and fourth truck lever 128. It will be appreciated that movement of the second lever 42 causes movement of the actuating lever 54 which engages the trigger 56 of the brake regulator 50, thereby causing the brake regulator to either extend or contract as is dictated by the slack in the brake rigging. Such movement changes the position of the brake regulator ends to maintain a fixed ratio of the movement of the brake cylinder assembly 32 with respect to the brake beam assemblies 76, 83, 122 and 134, regardless of the amount of slack initially in the braking system.

To simplify the disclosure, like members identify similar parts throughout the drawings. In the embodiment of the invention illustrated in FIGS. 5, 6, 7 and 8, the railway car may be of any conventional type such as that hereinbefore described with reference to FIGS. 1—4. The brake cylinder assembly 32 is mounted on the horizontally disposed shear plate 16 which is connected to the sills. One end of a substantially horizontally extending cylinder lever 144 is pivotally connected to the brake cylinder assembly 32, as at 146. The brake regulator 50 is connected to the medial portion of the cylinder lever 144, as at 148. It will be appreciated that the slack adjuster 50 is directly over the center sill 14, and at the same time partially enclosed by the center sill hood sheet 29, as best seen in FIG. 7. The other end of the cylinder lever 144 is pivotally connected to one end of a linkage means 150, as at 152. An actuating lever 154 is also pivotally connected at the connection 152, and is adapted to medially engage the trigger 56 protruding from the top of a brake regulator 50, as best seen in FIGS. 6 and 7. A second substantially vertically disposed lever 156 is medially pivotally mounted on bracket 158, as at 160, bracket 158 being attached to the center sill 14, as seen in FIG. 7. The upper end of the second lever is pivotally connected to the linkage 150, as at 162, and the other end thereof is pivotally connected to a rod 164, as at 166, the rod being substantially horizontally disposed. The other end of the rod 164 is pivotally attached to a first truck lever 168 as at 170. One end of a bottom rod 172 is attached to the medial portion of the first truck lever 168 at 174, and the other end of the bottom rod is attached to the medial portion of a second truck lever 176 as at 178, said bottom rod passing through its respective bolster 17. One end of the second truck lever 176 is connected to a fulcrum connecting link 180, as at 182, FIG. 6. This link is connected to a fixedly mounted fulcrum member 184. Brake beam assemblies 186 and 188 are attached to the ends of the truck levers 168 and 176, for engaging wheels 85 and 78 (FIG. 5), respectively.

In order to operate the brake mechanism at the other end of the car, a center rod 190 is attached to the end of the brake regulator 50 and is also attached to the medial portion of a third lever 192, as at 194, the third lever being substantially horizontally disposed. One end of the third lever 192 is pivotally connected, as at 196, to a fixedly mounted bracket 198, as best seen in FIG. 6. The other end of the third lever is pivotally attached to linkage 200, as at 202. A fourth lever 204 is medially pivotally connected, as at 206, to a fixedly mounted bracket 208, provided for the purpose. One end of the fourth lever is pivotally connected to the linkage 200, as at 210, and the other end thereof is pivotally connected to a rod 212, as at 213, the rod being substantially horizontally disposed. A third truck lever 214 is provided having one end pivotally connected to the rod 212, as at 216, and a second bottom rod 218 is pivotally attached to the medial portion thereof, as at 220, as best seen in FIGS. 6 and 7. The other end of the bottom rod 218 is pivotally connected to a fourth truck lever 222, as at 224. As seen in FIG. 6, one end of the fourth truck lever 222 is pivotally connected to a link 224, as at 226, the link being connected to a fixedly mounted fulcrum 228. Brake beam assemblies 230 and 232 are attached to the ends of the truck levers 214 and 222, respectively, for engaging the wheels (not shown) of the railway car.

In operation, movement of the brake cylinder assembly 32 causes movement of the cylinder lever 144 which, in turn, moves the first connecting link 150, the first lever 156, the rod 164, the first truck lever 168, the bottom rod 172, and the second truck lever 176, thereby actuating the brake beam assemblies 186 and 188, respectively. At the other end of the railway car, movement is transmitted to the brake beam assemblies 230 and 232 by means of movement of the center rod 190 which moves the linkage 200, fourth lever 204, rod 212, third truck lever 214, second bottom rod 218 and fourth truck lever 222. It will be appreciated that the movement of the cylinder lever 144 causes movement of the actuating rod 154 (FIG. 6) which engages the trigger 56 of the brake regulator 50, thereby causing the brake regulator to either extend or contract as is dictated by the slack in the brake rigging. This movement changes the position of the brake regulator ends, thereby maintaining a fixed ratio of the movement of the brake cylinder assembly 32 with respect to the brake beam assemblies 186, 188, 230 and 232 regardless of the amount of slack initially in the braking system.

As pointed out hereinbefore, like numerals identify similar parts throughout the drawings. In the embodiment of the invention illustrated in FIGS. 9, 10 and 11, the railway car may be of any conventional type such as one having a center sill 14, a horizontally disposed shear plate 16, a bolster 17, and angularly disposed slope sheets 18 mounted on slope sheet support 24 which, in turn, is mounted on the shear plate 16. At the end of the car, an end post 26 is provided.

Still referring to the embodiment of the invention shown in FIGS. 9, 10 and 11, the braking system includes a brake cylinder 32 mounted on a bracket 234 which, in turn, is mounted on the shear plate 16 adjacent the slope sheet support 24. It will be appreciated that the brake cylinder assembly 32 is mounted as high as practical on the railway car. The upper end of a substantially vertically extending cylinder lever 236 is pivotally connected to a fixed cylinder lever support member 238, as at 240, the support member being mounted between the slope sheet 18 and the end post 26. The brake cylinder assembly is connected to the medial portion of the cylinder lever 236 as at 242.

For handbrake operation a bell crank 244 is pivotally mounted on the end post 26 as at 246, and is connected to a medial portion of the cylinder lever 236 as by means of chain 248, provided for the purpose. The other end of the cylinder lever 236 is pivotally connected to one end of the brake regulator 50, as at 248. The brake regulator 50 is provided with protruding trigger 250 which is adapted to engage a fixed trigger stop 252 mounted on the center sill 14. That is, movement of the cylinder lever 236 causes movement of the regulator 50 which causes the trigger 250 to engage the fixed trigger stop 252, thereby actuating the brake regulator. It will be appreciated that a fixed trigger stop provides more positive and finer adjustment of the slack in the brake rigging, as compared to a floating trigger stop.

The other end of the brake regulator 50 is pivotally connected to one end of a first truck lever 254, as at 256. As best seen in FIG. 9, a second truck lever 258 is connected to a fulcrum-connecting link 260, as at 262. This link is connected to a fixedly mounted fulcrum member 264. A bottom rod 266 passes through the bolster 17 and interconnects the medial portions of the truck lever 254 and 258, as at 268 and 270, respectively. Brake beam assemblies 272 and 274 are attached to the ends of the truck levers 254 and 258 for engaging wheels 85 and 78, respectively.

In operation, movement of the brake cylinder assembly 32 causes movement of the cylinder lever 236 which, in turn, moves the brake regulator 50, the first truck lever 254, the bottom rod 266 and the second truck lever 258, thereby actuating the brake beam assemblies 272 and 274, respectively. At the same time, movement of the cylinder lever 236 causes movement of the brake regulator 50 (FIG. 9), which causes the trigger 250 to engage the fixed trigger stop 252, thereby causing the brake regulator to either extend or contract as is dictated by the slack in the brake rigging. This movement changes the positions of the brake regulator ends, thereby maintaining a fixed ratio of the movement of the brake cylinder assembly 32 with respect to the brake beam assemblies 272 and 274 regardless of the amount of slack initially in the brake system.

It will thus be seen that the present invention does indeed provide an improved braking system which is superior in simplicity, economy and efficiency as compared to prior art such devices.

We claim:

1. In a railway car having a car frame including side sills, a center sill, slope sheets, an end post, and end sill interconnecting said end post and said center sill, and a center sill hood sheet disposed over said center sill, a braking system comprising a brake cylinder assembly mounted on the car frame adjacent one end thereof, a cylinder lever having one end pivotally connected to a fixed cylinder lever supporting member and having the medial portion connected to said brake cylinder assembly, a rod having one end connected to the other end of said cylinder lever, a second lever having one end connected to the other end of said rod, means connected to the other end of said second lever for actuating brake means, and a brake regulator connected to the medial portion of said second lever, said brake regulator being substantially horizontally disposed and mounted under said center sill hood sheet.

2. A braking system according to claim 1 wherein said brake regulator is disposed under said center sill, and wherein said brake regulator has a protruding trigger, an actuating lever connected to the other end of said second lever, said actuating lever being engageable with said trigger for actuating said brake regulator responsive to motion of said second lever.

3. In a railway car of the class described, a braking system according to claim 1 wherein said cylinder lever is substantially vertically disposed and the upper end thereof is connected to the fixed cylinder lever support member, and wherein said second lever and said actuating lever and said brake regulator are substantially horizontally disposed.

4. A braking system according to claim 1 wherein said means connected to the other end of said second lever for actuating the brake means comprises a third lever medially pivotally mounted on a fixed bracket, a connecting link interconnecting the other end of said second lever and one end of said third lever, a first truck lever, a truck lever-connecting link interconnecting the other end of said third lever, and one end of said first truck lever, a second truck lever, a bottom rod interconnecting the other end of said first truck lever with one end of said second truck lever, the other end of said second truck lever being pivotally attached to a fulcrum-connecting link, a fulcrum member connected to said fulcrum link, and brake beam assemblies medially mounted on said truck levers, respectively.

5. A braking system according to claim 1 further comprising a center rod connected to said brake regulator, a fourth lever pivotally mounted at one end on a fixed bracket, said center rod being pivotally connected to the medial portion of said fourth lever, a fifth lever medially pivotally mounted on a fixed bracket, a second connecting link interconnecting the other end of said fourth lever and one end of the fifth lever, a third truck lever, a second truck lever-connecting link interconnecting the other end of said fifth lever and one end of said third truck lever, a fourth truck lever pivotally connected to fulcrum means at one end thereof, a second bottom rod interconnecting the other end of said third truck lever with the other end of said fourth truck lever, and brake beam assemblies medially mounted on said third and fourth truck levers, respectively.

6. A braking system according to claim 5 wherein said brake regulator and said center rod and said fourth lever are substantially horizontally disposed, and wherein said fifth lever is substantially vertically disposed.

7. In a railway car of the class described, a braking system comprising a brake cylinder assembly mounted on the car frame adjacent one end thereof, a cylinder lever having one end pivotally connected to a fixed cylinder lever support member, and having the medial portion connected to said brake cylinder assembly, a rod having one end connected to the other end of said cylinder lever, a second lever having one end connected to the other end of said rod, a brake regulator connected to the medial portion of said second lever, a third lever medially pivotally mounted on a fixed bracket, a connecting link interconnecting the other end of said second lever and one end of said third lever, a truck lever, a truck lever connecting link interconnecting the other end of said third lever and one end of said truck lever, a second truck lever, a bottom rod interconnecting the other end of said first truck lever with one end of said second truck lever, the other end of said second truck lever being pivotally attached to a fulcrum-connecting link, a fulcrum member connected to said fulcrum-connecting link, and brake beam assemblies medially mounted on said truck levers respectively, a center rod connected to said brake regulator, a fourth lever pivotally mounted at one end on a fixed bracket, said center rod being pivotally connected to the medial portion of said fourth lever, a fifth lever medially pivotally mounted on a fixed bracket, a connecting link interconnecting the other end of said fourth lever and one end of the fifth lever, a third truck lever, a truck lever-connecting link interconnecting the other end of said fifth lever and one end of said third truck lever, a fourth truck lever pivotally connected to fulcrum means at one end thereof, a second bottom rod interconnecting the other end of said third truck lever with the other end of said fourth truck lever, and brake beam assemblies medially mounted on said third and fourth truck levers, respectively.

8. In a railway car having a car frame including side sills, a center sill, slope sheets, an end post, an end sill interconnecting said end post and said center sill, a center sill hood sheet disposed over said center sill, and bolsters, a braking system comprising a bracket depending downwardly from said slope sheet, a brake cylinder assembly mounted on said bracket adjacent one end of said railway car, a fixed cylinder lever support member mounted between said slope sheets and said end post, a substantially vertically disposed cylinder lever having the upper end pivotally connected to said fixed cylinder lever support member and having the medial portion connected to said brake cylinder assembly, a substantially horizontally disposed rod having one end connected to the other end of said cylinder lever, a substantially horizontally disposed second lever having one end connected to the other end of said rod, a substantially horizontally disposed brake regulator connected to the medial portion of said second lever, said brake regulator being disposed under said center sill, a third lever medially pivotally mounted on a fixed bracket, a connecting link interconnecting the other end of said second lever and one end of said third lever, a first truck lever, a truck lever-connecting linkage interconnecting the other end of said third lever and one end of said truck lever, a second truck lever, a bottom rod interconnecting the other end of said first truck lever with one end of said second truck lever, said bottom rod being disposed under its respective bolster, the other end of said second truck lever being pivotally attached to a fulcrum-connecting link, a fulcrum member connected to said fulcrum-connecting link, and brake beam assemblies medially mounted on said truck levers, respectively, a substantially horizontally disposed center rod connected to said brake regulator, a substantially horizontally disposed fourth lever pivotally mounted at one end on a fixed bracket, said center rod being pivotally connected to the medial portion of said fourth lever, a substantially vertically disposed fifth lever medially pivotally mounted on a fixed bracket, a connecting link interconnecting the other end of said fourth lever and one end of the fifth lever, a third truck lever, a truck lever-connecting link interconnecting the other end of said fifth lever and the one end of said third truck lever, a fourth truck lever pivotally connected to fulcrum means at one end thereof, a second bottom rod interconnecting the other end of said third truck lever with the other end of said fourth truck lever, said second bottom rod being disposed under its respective bolster, and brake beam assemblies medially mounted on said third and fourth truck levers respectively, and said brake regulator having a protruding trigger, a substantially horizontally disposed actuating lever connected to the other end of said second lever, said actuating lever being engageable with said trigger for actuating said brake regulator responsive to motion of said second lever.

9. In a railway car having a car frame including a center sill, slope sheets, an end post, a shear plate, and a center sill hood sheet disposed over said center sill, a braking system comprising a brake cylinder assembly mounted on the car frame adjacent one end thereof, a cylinder lever having one end pivotally connected to said brake cylinder assembly, a brake regulator connected to the medial portion of said cylinder lever, said brake regulator being disposed under said center sill, a second lever medially pivotally mounted on a fixed bracket, first linkage means interconnecting the other end of said cylinder lever and one end of said second lever, a rod having one end pivotally connected to the other end of said second lever, means connected to the other end of said rod for actuating brake means.

10. A braking system according to claim 9 wherein said brake regulator has a protruding trigger, an actuating lever connected to the other end of said cylinder lever, said actuating lever being engageable with said trigger for actuating said brake regulator responsive to motion of said cylinder lever.

11. A braking system according to claim 9 wherein said cylinder lever, said rod, and said brake regulator are substantially horizontally disposed, and wherein said second lever is substantially vertically disposed.

12. A braking system according to claim 9 wherein said means connected to the other end of said rod for actuating the brake means comprises a first truck lever having one end connected to the other end of said rod, a fulcrum member, a fulcrum-connecting link, a second truck lever having one end pivotally connected to said fulcrum-connecting link, a bottom rod interconnecting the medial portions of said first and second truck levers respectively, and brake beam assemblies mounted on the other ends of said truck levers, respectively.

13. A braking system according to claim 9 further comprising a center rod connected to said brake regulator, a third lever having one end pivotally mounted on a fixed bracket, said center rod being pivotally connected to a medial portion of said third lever, a fourth lever medially pivotally mounted on a fixed bracket, linkage means interconnecting the other end of said third lever with one end of said fourth lever, a third truck lever, a rod having one end pivotally connected to the other end of said fourth lever, and having the other end connected to a fixedly mounted fulcrum, a bottom rod interconnecting the medial portion of said third and fourth truck levers, and brake beam assemblies mounted on the other ends of said third and fourth truck levers, respectively.

14. A braking system according to claim 13 wherein said center rod and said third lever are substantially horizontally disposed, and wherein said fourth lever is substantially vertically disposed.

15. In a railway car having a car frame including a center sill, slope sheets, an end post, a shear plate, and a center sill hood sheet disposed over said center sill, a braking system comprising a brake cylinder assembly mounted on the car frame adjacent one end thereof, a cylinder lever having one end pivotally connected to said brake cylinder assembly, a brake regulator connected to the medial portion of said cylinder lever, said brake regulator being disposed under said center sill hood sheet, a second lever medially pivotally mounted on a fixed bracket, first linkage means interconnecting the other end of said cylinder lever and one end of said second lever, a rod having one end pivotally connected to the other end of said second lever, a first truck lever having one end connected to the other end of said rod, a fulcrum member, a fulcrum-connecting link, a second truck lever having one end pivotally connected to said fulcrum-connecting link, a bottom rod interconnecting the medial portions of said first and second truck levers respectively, and brake beam assemblies mounted on the other ends of said truck levers respectively, a center rod connected to said brake regulator, a third lever having one end pivotally mounted on a fixed bracket, said center rod being pivotally connected to a medial portion of said third lever, a fourth lever medially pivotally mounted on a fixed bracket, linkage means interconnecting the other end of said third lever with one end of said fourth lever, and third truck lever, a rod having one end pivotally connected to the other end of said fourth lever, and having the other end connected to said third truck lever, a fourth truck lever pivotally connected to a link which is connected to a fixedly mounted fulcrum, a bottom rod interconnecting the medial portions of said third and fourth truck levers, and brake beam assemblies mounted on the other ends of said third and fourth truck levers, respectively.

16. In a railway car having a car frame including a center sill, slope sheets, an end post, a shear plate, bolsters, and a center sill hood sheet disposed over said center sill, a braking system comprising a brake cylinder assembly mounted on a bracket depending downwardly from said slope sheet adjacent one end of said car, a substantially horizontally disposed cylinder lever having one end pivotally connected to said brake cylinder assembly, a substantially horizontally disposed brake regulator connected to the medial portion of said cylinder lever, said brake regulator being disposed under said center sill hood sheet, said brake regulator having a protruding trigger, an actuating lever connected to the other end of said cylinder lever, said actuating lever being engageable with said trigger for actuating said brake regulator responsive to motion of said cylinder lever, a substantially vertically disposed second lever being medially pivotally mounted on a fixed bracket, first linkage means interconnecting the other end of said cylinder lever and one end of said second lever, a rod having one end pivotally connected to the other end of said second lever, a first truck lever having one end connected to the other end of said rod, a fulcrum member, a fulcrum-connecting link, a second truck lever having one end pivotally connected to said fulcrum-connecting link, a bottom rod passing through its respective bolster, and interconnecting the medial portions of said first and second truck levers respectively, and brake beam assemblies mounted on the other ends of said truck levers respectively, a substantially horizontally disposed center rod connected to said brake regulator, a substantially horizontally disposed third lever having one end pivotally mounted on a fixed bracket, said center rod being pivotally connected to a medial portion of said third lever, a substantially vertically disposed fourth lever medially pivotally mounted on a fixed bracket, linkage means interconnecting the other end of said third lever with one end of said fourth lever, a third truck lever, a substantially horizontally disposed rod having one end pivotally connected to the other end of said fourth lever, and having the other end connected to said third truck lever, a fourth truck lever pivotally connected to a link which is connected to a fixedly mounted fulcrum, a bottom rod passing through its respective bolster and interconnecting the medial portions of said third and fourth truck levers, and brake beam assemblies mounted on the other ends of said third and fourth truck levers, respectively.

17. In a railway car having a car frame including a center sill, slope sheets, an end post, and a shear plate, a braking system comprising a brake cylinder assembly mounted on the car frame adjacent one end thereof, a cylinder lever having one end pivotally connected to a fixed cylinder lever support member and having a medial portion connected to said brake cylinder assembly, a brake regulator having one end pivotally connected to the other end of said cylinder lever, and means connected to the other end of said brake regulator for actuating brake means.

18. A braking system according to claim 17, further comprising a fixed trigger stop mounted on said center sill, said brake regulator having a protruding trigger, said trigger being engageable with said fixed trigger stop for actuating said brake regulator responsive to movement of said brake regulator.

19. A braking system according to claim 17 wherein said cylinder lever is substantially vertically disposed, and wherein said brake regulator is substantially horizontally disposed.

20. A braking system according to claim 17 wherein said means connected to the other end of said brake regulator for actuating said brake means comprises a first truck lever having one end connected to the other end of said brake regulator, a fulcrum member, a fulcrum-connecting link, a second truck lever having one end pivotally connected to said fulcrum connecting link, a bottom rod interconnecting the medial portions of said first and second truck levers, and truck beam assemblies mounted on the other ends of said truck levers, respectively.

21. A braking system according to claim 17 further comprising a bell crank pivotally mounted on said end post, a chain interconnecting said bell crank with the medial portion of said cylinder lever, whereby said braking system may be hand-operated.

22. In a railway car having a car frame including a center sill, slope sheets, an end post, a bolster, and a shear plate, a braking system comprising a brake cylinder assembly mounted on the car frame adjacent one end of the car, a cylinder lever having one end pivotally connected to the fixed cylinder lever support member and having a medial portion connected to said brake cylinder assembly, a brake regulator having one end pivotally connected to the other end of said cylinder lever, a fixed trigger stop mounted on said center sill, said brake regulator having a protruding trigger, said trigger being engageable with said fixed trigger stop for actuating said brake regulator responsive to movement of said brake regulator, a first truck lever having one end connected to the other end of said brake regulator, a fulcrum member, a fulcrum-connecting link, a second truck lever having one end pivotally connected to said fulcrum-connecting link, a bottom rod interconnecting the medial portions of said first and second truck levers, and brake beam assemblies mounted on the other ends of said truck levers, respectively.

23. In a railway car having a car frame including a center sill, slope sheets, an end post, a bolster, and a shear plate, a braking signal comprising a brake cylinder assembly mounted on a bracket mounted on said shear plate adjacent one end of the car, a fixed cylinder lever support member interposed between said slope sheet and said end post, a substantially vertically disposed cylinder lever having one end pivotally connected to said fixed cylinder support member and having the medial portion connected to said brake cylinder assembly, a substantially horizontally disposed brake regulator having one end pivotally connected to the other end of said cylinder lever, a fixed trigger stop mounted on said center sill, said brake regulator having a protruding trigger, said trigger being engageable with said fixed trigger stop for actuating said brake regulator responsive to movement of said brake regulator, a first truck lever having one end connected to the other end of said brake regulator, a fulcrum member, a fulcrum-connecting link, a second truck lever having one end pivotally connected to said fulcrum-connecting link, a bottom rod passing through said bolster interconnecting the medial portions of said first and second truck levers, and brake beam assemblies mounted on the other ends of said truck levers respectively, a bell crank pivotally mounted on said end post, a chain interconnecting said bell crank with the medial portion of said cylinder lever.

PO-1050
(5/69)

UNITED STATES PATENT OFFICE
CERTIFICATE OF CORRECTION

Patent No. 3,543,889           Dated    December 1, 1970

Inventor(s) Charles F. Roselius and George A. Pelikan

It is certified that error appears in the above-identified patent and that said Letters Patent are hereby corrected as shown below:

Column 6, line 2 of claim 1, for "and end sill" read
--an end sill--; Column 8, line 9 of claim 13, after "end"
and before "con-" insert --connected to said third truck
lever, a fourth truck lever pivotally connected to a link
which is--.

Signed and sealed this 6th day of April 1971.

(SEAL)
Attest:

EDWARD M. FLETCHER, JR.
Attesting Officer

WILLIAM E. SCHUYLER, JR
Commissioner of Patents